United States Patent [19]
Starke et al.

[11] Patent Number: 6,016,016
[45] Date of Patent: Jan. 18, 2000

[54] VOLTAGE SUPPLY APPARATUS

[75] Inventors: Henry Starke, Ellerbek; Andrew Muirhead, Hamburg, both of Germany

[73] Assignee: Luftansa Technik AG, Hamburg, Germany

[21] Appl. No.: 09/085,113

[22] Filed: May 28, 1998

[30] Foreign Application Priority Data

May 31, 1997 [DE] Germany ............................ 197 22 922

[51] Int. Cl.$^7$ ....................................................... H02J 3/06
[52] U.S. Cl. .............................. 307/9.1; 307/38; 395/283
[58] Field of Search ................................ 307/9.1, 38, 90, 307/125, 119; 333/12, 181; 395/283

[56] References Cited

U.S. PATENT DOCUMENTS 3,370,813  2/1968  Albertine et al. .
4,580,112  4/1986  Winslow et al. ............................ 333/12
5,158,473  10/1992 Takahashi et al. ....................... 439/489
5,621,256  4/1997  Crane et al. .............................. 307/125
5,713,541  2/1998  Schmitz et al. ...................... 246/187 A Primary Examiner—Albert W. Paladini
Attorney, Agent, or Firm—Diller, Ramik & Wight, PC

[57] ABSTRACT

A voltage supply apparatus for providing a supply voltage for electric devices in an aeroplane cabin comprises a socket (22) to which the electric device is connectable by means of a plug (38). The socket (22) comprises plug detectors (45, 46) detecting the presence of the plug in the socket (22). A supply device (16) is arranged remotely from the socket (22) and is connected to the socket (22) via a signal line (18) and via a supply line (20) for the supply voltage. The supply device (16) applies the supply voltage to the socket (22) if the plug detectors (45, 46) indicate the presence of the plug (38) via the signal line (18) to the supply device. The supply lines (20) and the socket (22) are only alive if the insertion of a plug (38) has been detected. In this way, a danger to people due to manipulations on the socket or on the supply line is excluded.

15 Claims, 3 Drawing Sheets

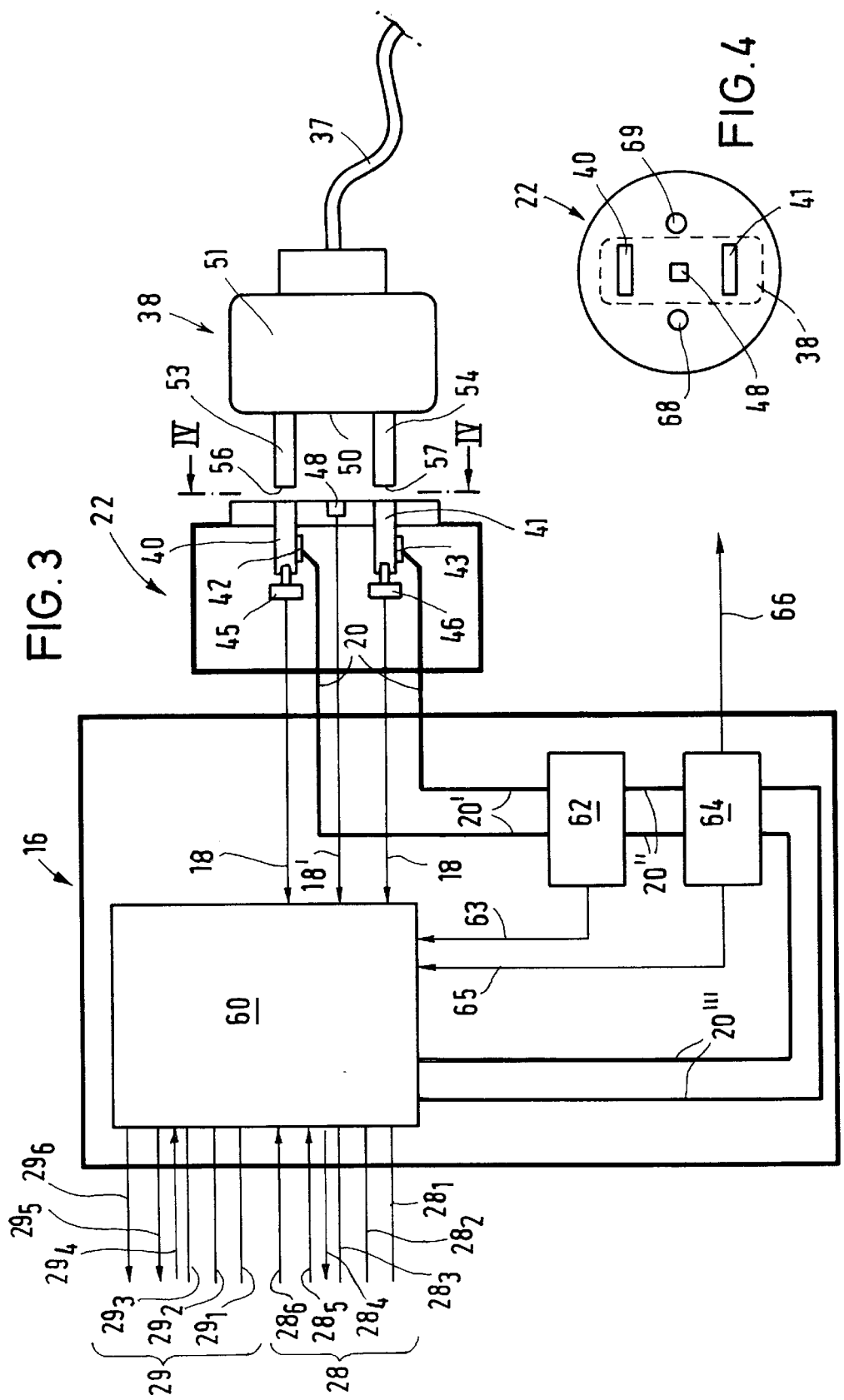

VOLTAGE SUPPLY APPARATUS

BACKGROUND OF THE INVENTION

The invention relates to a voltage supply apparatus for providing a supply voltage for electric devices in an aeroplane cabin.

Voltage supply apparatus in aeroplane cabins, as disclosed in U.S. Pat. No. 3,370,813, usually serve to provide a voltage supply to the passenger for operating electric devices, for example computers, electronic entertainment devices, chargers etc. For this purpose, sockets are arranged in the interior space of the aeroplane cabin, in most cases in the area of a passenger seat or a seating unit, into which the plug of the electric device can be inserted and by means of which the device can be connected to a supply voltage which can be applied to the plug.

In supplying and operating electric devices in an aeroplane, two safety aspects have to be taken into consideration: Firstly, the safety of the passengers has to be assured, and secondly, the electric device must not feed interferences into the electric on-board network of the aeroplane. Because of the safety of the passengers, a DC voltage of up to 30 V is provided on the socket in known voltage supply apparatus. A disadvantage of this is that not every electric device can be operated with a low DC voltage. Furthermore, special connection cables are necessary in current supplies of this kind by means of which the electric device is connected to the socket.

Known are also voltage supply apparatus providing 220/110 V mains voltage for aeroplane passengers' devices so that practically any electric device can be connected by means of its mains plug. The voltage supply is turned on and off by means of a loose-key switch on the socket, the corresponding key being supplied by the flight personnel. In this system, it is neither ensured that the passengers are free from danger from the mains voltage, nor is the aeroplane on-board network secured against interferences from the connected electric devices.

SUMMARY OF THE INVENTION

It is the object of the invention to provide a voltage supply for electric devices in an aeroplane cabin which improves passenger safety.

The socket comprises a plug detector detecting the presence of a plug inserted in the socket. A supply device arranged remotely from the socket is connected to the socket via a signal line and via a supply line for the supply voltage. The supply device applies the supply voltage to the socket when the plug detector signals the presence of a plug via the signal line to the supply device.

A supply voltage is only available at the socket when a plug is inserted in the socket, i. e., no supply voltage is provided on the two-pole socket as long as no plug of an electric device is inserted. This excludes a danger to people by a potentially high supply voltage in the socket when the socket is not used. Even corresponding manipulations of the socket by children by means of paper clips, knitting needles etc. and dangers arising from this can be effectively prevented. Thus, no safety concerns preclude a supply of a mains voltage to the electric devices.

By means of the separate and remote arrangement of the supply device and the socket, the supply device potentially having a mains voltage can be arranged remotely from the actual drawing location, i. e., the socket. Thereby the supply device can be arranged such as not to be a source of danger to the passenger. In the normal case, i. e., when the socket is not used, only a small signal voltage, but not the supply voltage, is applied to the lines between the supply device and the socket. The supply lines being arranged on the seat only provide a supply current when an electric device really is connected. In the unused state, the supply lines are free from supply voltage and do not present a source of danger to people.

Preferably, the plug detector is formed such that it detects the presence of a contact pin of the plug in the socket. In this manner, a plug inserted into the socket can be reliably detected.

Preferably, the supply device only applies the supply voltage to the socket when two contact pins of the plug are detected simultaneously. If both contact pins are detected simultaneously, it can be supposed with a high probability that no manipulation of the socket has occurred and that a plug really has been inserted. This way, an increased security against manipulation and undesired supply of the supply voltage to the socket is achieved.

In a preferred embodiment, the supply device only applies the supply voltage to the socket when a maximum time of contact between the first detection of the first and second contact pins is not exceeded. It is also checked if the two contact pins are inserted into the socket at approximately the same time. In the case of too large a difference of time between the insertion of the two contact pins, it is assumed that the socket is being manipulated. In this case, no supply voltage is applied to the socket so that a danger to a person is excluded.

In a preferred embodiment, the plug detector comprises mechanical switches being operated by the inserted contact pins. Thereby a simple and reliable detection of the contact pins is ensured.

Preferably, the plug detector is a casing detector detecting the presence of the plug casing of the plug on the socket. It is only when the plug casing is approached close enough, i. e., closer than a predetermined distance value, that the inserted plug casing is detected. This fulfils an alternative or additional criterion for the detection of the plug on the socket. The socket is secured against manipulation in a highly safe manner, and a supply voltage is only supplied when a plug casing is really present on the socket.

In a preferred embodiment, the casing detector is an optical reflection sensor detecting a minimum distance of the plug casing to the socket. The reflection sensor can be arranged such as to detect the frontal side of the plug when it is below a minimum distance to the plug casing.

Preferably, the supply device only applies the supply voltage to the socket when both the plug detector and the casing detector indicate the presence of a plug. In this manner, a manipulation, i. e., a simulation of an inserted plug, can be virtually excluded.

In a preferred embodiment, the supply apparatus comprises a line supervision detector for electromagnetic interferences of certain frequencies in electric lines of the supply apparatus. The line supervision detector is arranged in the course of the supply lines and can be combined with a line filter. The line supervision detector detects electromagnetic interferences being fed by the electric device into the supply line of the supply apparatus via the plug and the socket. Thereby interfering electric devices can be located and be turned off selectively.

The supply apparatus can also comprise a receiver detector for emitted electromagnetic interference signals of certain frequencies. By means of this receiver detector, interfering electric devices which are not fed via the socket with the supply voltage but are operated by accumulator or battery, for example, can be localized. This often applies to electronic entertainment devices and mobile phones etc., which have a high interference potential.

Preferably, the supply apparatus comprises a fault current detector outputting a corresponding electric signal if a fault current occurs. The supply apparatus can also comprise a short circuit detector detecting a short circuit and causing a current limitation. Thereby it is avoided that the current supply overloads the supply devices.

Preferably, the supply apparatus comprises a voltage switch being turned off immediately if one or several of the detectors detect an interference. Once an interference occurs which could cause danger to people or interfere with the on-board network, the current supply of the socket is interrupted.

In a preferred embodiment, the socket can be associated with a display device for displaying the state of the supply apparatus. It serves to inform the passenger about the availability of the current supply. For example, a standby signal can be displayed on the display indicating if the current is supplied to the socket or if the current supply for the socket is generally disabled.

Preferably, the socket can be formed for at least two different kinds of plugs. In this way, for example, both plugs according to the European and plugs according to the US standards can be inserted into a socket providing a mains current.

Preferably, the socket and the supply apparatus are associated to one or multiple passenger seats. Thereby a current supply is available to the passenger at their seat by means of which they can operate a computer or electronic entertainment devices.

In a preferred embodiment, a central current source is provided for the voltage supply of the supply devices, the current source being adapted to be turned off by a control signal. This control signal can be caused, for example, by the flight personnel, or automatically. Thereby it is possible to turn off all the electric devices immediately and reliably in situations in which a high security from interferences is required.

Preferably, the voltage source controls the supply devices such that only a limited number of supply devices can be used. Thereby an overload of the voltage source is prevented so that a high operational reliability for the electric devices in operation is assured.

According to an alternative aspect, the voltage supply apparatus is provided with a detector for electromagnetic interferences. If the detector indicates an electromagnetic interference, the supply device registers and signalizes the interference.

BRIEF DESCRIPTION OF THE DRAWINGS

An embodiment of the invention will now be described in greater detail with reference to the drawings.

FIG. 3 shows a circuit diagram of the supply device and the socket, FIG. 4 shows a top plan view on the frontal side of the socket.

DESCRIPTION OF THE PREFERRED EMBODIMENTS

Figure 1:
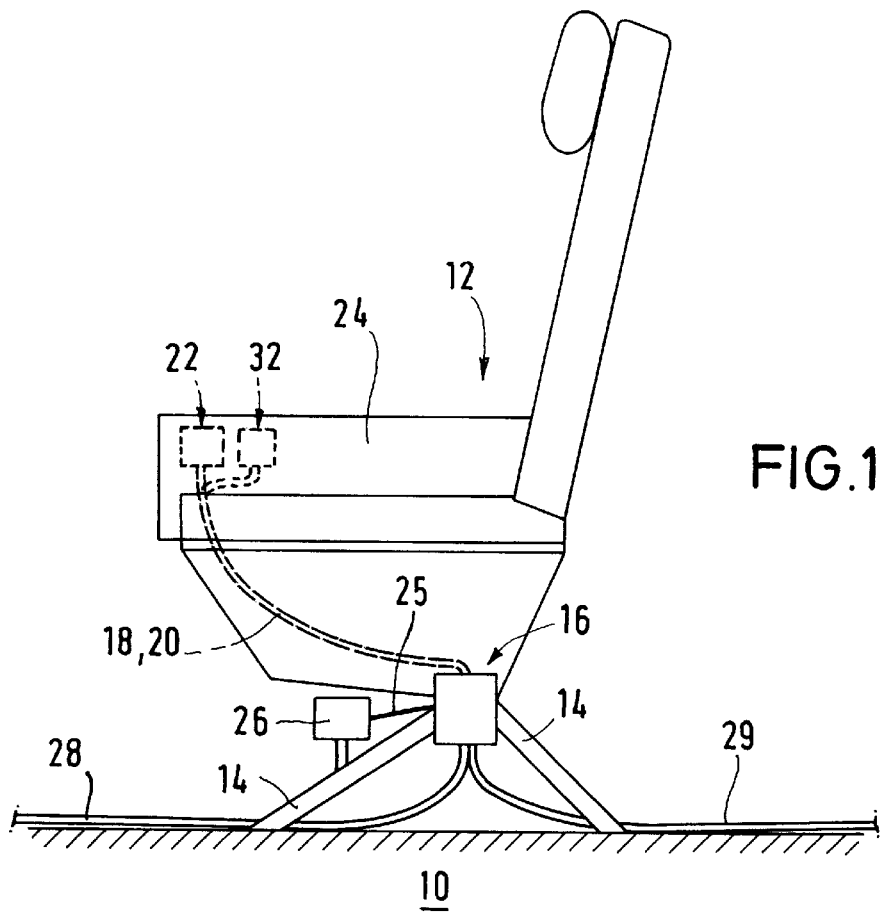
FIG. 1 shows a lateral view of a passenger seat with a voltage supply apparatus, including the supply device and the socket.
Figure 2:
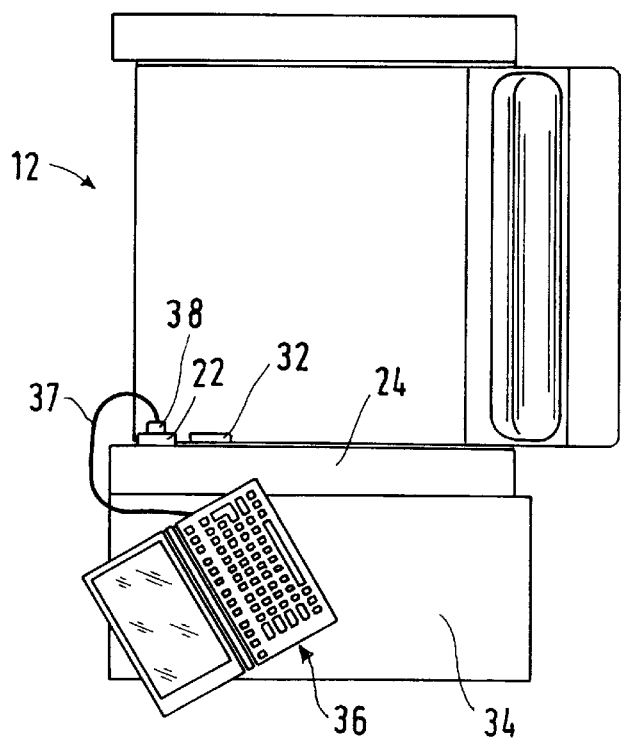
FIG. 2 shows the passenger seat of FIG. 1 in a top plan view, with an electric device connected thereto.

In FIGS. 1 and 2, a passenger seat 12 with a voltage supply apparatus for operating electric devices of a passenger is represented. The passenger seat 12 is located on a cabin floor 10 of an aeroplane cabin and comprises a floor frame 14 on which a supply device 16 is releasably mounted. The supply device 16 is connected to a socket 22 in the left armrest 24 of the passenger seat 12 via a signal line 18 and a double-wire supply line 20. The supply device 16 and the socket 22 are each provided in housings of their own. The supply device 16 is connected, via a further signal line 25, to a seat signaling device 26 fixedly connected to the seat 12, the seat signaling device 26 providing a permanently stored seat identification to the supply device 16. Furthermore, in the armrest, a display device 32 is mounted for displaying the operational state of the supply device 16.

Figure 5:
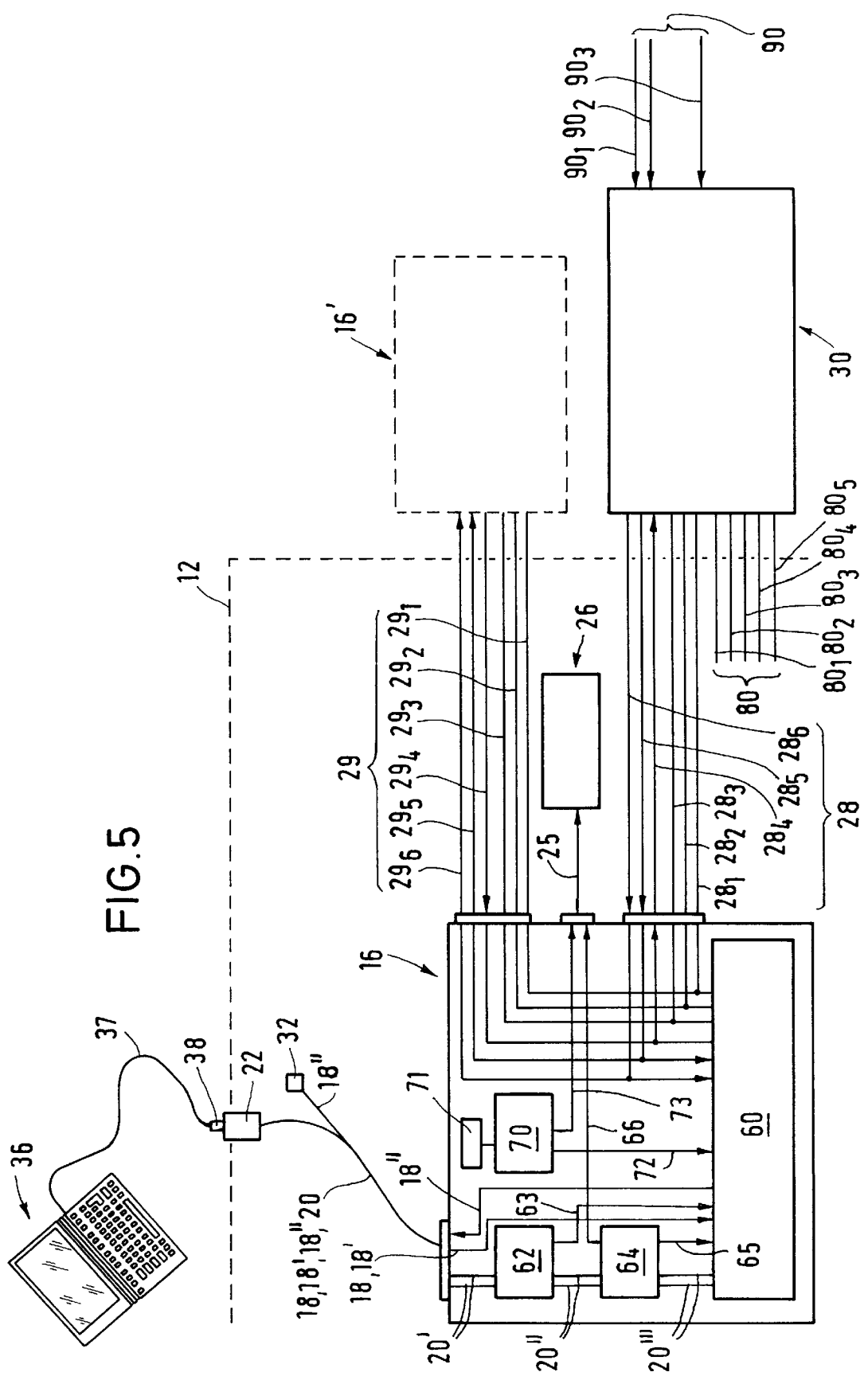
FIG. 5 shows a circuit diagram of multiple supply devices with a voltage source.

The supply device 16 is connected to a central voltage source 30 supplying multiple supply devices by means of an incoming supply cable 28 introduced into the supply device 16 (see FIG. 5). The supply device 16 of a subsequent passenger seat is connected by means of an outgoing supply cable 29 leading out of the supply device 16.

In FIG. 2, as an example, a table 34 is mounted to the side of the left armrest 24 of the passenger seat 12 on which a portable computer 36 is placed as an electric device. The computer 36 comprises a mains cable 37 with a plug 38 inserted in the socket 22.

In FIG. 3, the supply device 16 is schematically represented with the socket 22 and the plug 38. The socket 22 comprises two corresponding insertion holes 40, 41 on the insides of which a respective contact element 42, 43 is arranged. The contact elements 42, 43 are provided with a mains voltage of 110 V at a mains frequency of 60 Hz by the supply device 16 via two supply lines 20 once the safety conditions described below are met. This voltage, however, can also have another value, for example 230 V at 50 Hz. Furthermore, on the bottom of each insertion hole 40, 41, microswitches 45, 46, respectively, are arranged as plug detectors, which are each connected to the supply device 16 via a signal line 18.

On the frontal side of the socket 22, an optical infrared reflection sensor 48 is arranged as a casing detector. The reflection sensor 48 comprises a light emitting diode (LED) emitting infrared radiation and a receiver diode. If the distance of the frontal side 50 of the casing 51 of the plug 38 falls below a certain minimum distance, the rays emitted by the LED are reflected by the frontal side 50 of the casing of the plug 22 and received by the receiver diode. Thus the reflection sensor 48 can detect if a plug casing 51 is present at the socket 22.

When the two contact pins 53, 54 of the plug 38 are inserted into the insertion holes 40, 41 of the socket 22, the two contact pins 53, 54 are in contact with the contact elements 42, 43. Furthermore, the free ends 56, 57 of the contact pins 53, 54 actuate the two microswitches 45, 46 so that the insertion of the contact pins 53, 54 in the socket 22 can be detected by the supply device 16 by means of the microswitches 45, 46 via the signal lines 18. The reflection sensor 48 is also connected to the supply device 16 via a signal line 18'.

In the supply device 16, a control and supervision unit 60 is provided connected to the lines of the supply cables 28, 29. As inputs, it comprises the signal lines 18, 18' of the plug 22 as well as further signal lines 63, 65 of a short circuit detector 62 and a line supervision detector 64, which are also provided in the supply device 16.

The control and supervision unit 60 further comprises a voltage switch by means of which the supply voltage of 110 V, 60 Hz can be applied to the internal supply lines 20'''. The supply lines 20''' connect the control and supervision unit 60 to the line supervision detector 64 connected to the short circuit detector 62 via two extension supply voltage lines 20''. The output side of the short circuit detector 62 is connected to the contact elements 42, 43 of the socket 22 via two supply voltage lines 20' and via the subsequent supply lines 20.

During operation of the socket 22, i. e., when the control and supervision unit 60 has applied the supply voltage to the socket 22 via the supply lines 20, the short circuit detector 62 and the line supervision detector 64 have to perform extensive supervision tasks. On the one hand, a current limitation of the voltage supply to about 100 V is performed in the short circuit detector 62. Thereby an overload of the supply device 16 is prevented. Furthermore, when a strong overload is present, an overload signal is outputted by the short circuit detector to the control and supervision unit 60 via the signal line 63. The second function of the short circuit detector 62 is fault current detection. If the difference of the current flowing in the two current supply lines 20' exceeds a predetermined value, a corresponding signal is outputted via the signal line 63 to the control and supervision unit 60, which then turns off the current supply. Both control functions of the short circuit detector 62 thus serve to determine electric interferences caused by the electric device 36 or potential manipulations.

The line supervision detector 64 comprises a mains frequency filter filtering interference signals of high frequencies out of the supply lines 20, 20', 20''. Simultaneously, the appearance of such interfering frequencies is detected by the line supervision detector 64 and indicated via the signal line 65 to the control and supervision unit 60. Especially those frequencies are filtered and detected which have to be kept free for the safe operation of an aeroplane. These frequencies are defined in the RTCA DO 160-D standard. The line supervision detector 64 thus prevents electromagnetic interference signals which are supplied from the electric device 36 of the passenger via the mains cable from being fed into the on-board network of the aeroplane.

FIG. 4 shows the insertion side of the round socket 22 with the reflection sensor 48, the two insertion holes 40, 41 for plugs according to the US plug standard and two further insertion holes 68, 69 for mains plugs according to the European standard being provided in the center. The respective insertion hole pairs 40,41, 68,69 are provided at a right angle from each other so that both a plug 38 according to the US standard and a plug according to the European standard cover the central area of the socket in which the reflection sensor 48 is arranged. The insertion holes 68, 69 for European plugs also comprise a contact element and a microswitch each, which are connected to the respective signal and supply lines 18,18', 20 of the other insertion holes 40, 41. However, a second separate voltage supply of 230 V, 50 Hz can also be provided for the insertion holes 68, 69 for European plugs. Furthermore, the insertion hole pairs may also be arranged not at a right angle to each other but overlapping each other, with the microswitches then being arranged on the side of the insertion holes.

FIG. 5 shows an overall representation of an apparatus to supply voltage to electric devices. In addition to the means described in FIG. 3, the supply device 16 further comprises a receiver detector 70 comprising an antenna 71. By means of the receiver detector, electromagnetic waves of certain frequencies defined in the RTCA DO 160-D standard are detected. In this manner, electromagnetic interferences can be detected which are caused by mains-independent accumulator or battery operated electric devices, such as mobile phones, CD players etc.

Both the line supervision detector 64 and the receiver detector 70 are connected to the seat signaling device 26 via a respective signal line 66, 73 and via the signal line 25. The seat signaling device 26 provides a signal to a central device (or seat signaling device) via present signal lines of its own so that, if corresponding electromagnetic interferences occur, it is possible to localize the interferences by means of a display.

The control and supervision unit 60 is connected to the display device 32 in the armrest 24 via a further signal line 18''. The control and supervision unit 60 outputs information signals to the display device, which informs the passenger about the status of the control and supervision unit 60. The display device comprises a red and a green LED indicating the operational status of the supply device 16: when none of the two LEDs emits light, the supply device 16 is turned off. If the red LED continuously emits light, this indicates that the supply device 16 is operating, but that no supply voltage is available at the socket 22, as, for example, the central voltage source 30 would otherwise be overloaded. The flashing red LED indicates an interference by electromagnetic waves which has been signaled either by the line supervision detector 64 or the receiver detector 70. The flashing green LED indicates that the voltage supply on the socket 22 is about to be turned off, for example after about 60 seconds. Then the user has enough time to turn off their electric device, for example the computer 36, in a controlled manner. The green LED continuously emitting light indicates the unconditional operation of the voltage supply 16.

The supply device 16 is connected to the central voltage source 30 via the frontal supply cable 28 and to a further supply device 16' of a subsequent seat via the rear supply cable 29. The six lines of the supply cables 28, 29 each comprise three lines $28_1$, $28_2$, $28_3$, $29_1$, $29_2$, $29_3$ for the supply voltage of 110 V, 60 Hz and for the electric ground. Furthermore, each supply cable 28, 29 comprises three signal lines $28_4$, $28_5$, $28_6$, $29_4$, $29_5$, $29_6$ by means of which analog signals are transmitted from the voltage source 30 to the supply devices 16, 16' and vice versa.

If an operational fault by electromagnetic interference signals, short circuit, fault current etc. occurs, the control and supervision unit 60 of a supply device 16, 16' outputs a signal via a control line 28, 29, which signal is received by the central voltage source 30 and processed accordingly. The voltage source 30 outputs an enabling signal to the supply devices 16, 16' via a further signal line $28_5$, $29_5$ as long as a certain electric maximum load of the voltage source 30 has not been reached. If this maximum load is reached, a disabling signal is outputted to all the supply devices 16 via said signal line $28_5$, $29_5$ so that no further electric devices 36 can be supplied with supply voltage by means of the supply devices 16, 16'. Only if the load returns below the maximum load by a load reduction, for example by an electric device 36 being turned off, does the voltage source 30 transmit an enabling signal via said signal lines $28_5$, $29_5$ so that voltage is again available on all the supply devices 16 and can be supplied to the electric device 36.

The remaining signal lines $28_6$, $29_6$ are used to provide the "fasten seat belts" signal from the central voltage source 30 so that the supply devices 16, 16' can signal via the display devices 32 thereof, that the voltage supply is about to be turned off. This way, the user of the voltage supply can turn off their electric device connected to the voltage supply in a controlled manner.

The voltage source 30 is fed by a supply cable 80 comprising five supply lines $80_1$–$80_5$. The five lines $80_1$–$80_5$ comprise four lines by which the typical on-board voltage of 115 V, 400 Hz is supplied, as well as a ground line. The on-board voltage of 115 V and 400 Hz is transformed by the voltage source 30 into a mains voltage of 110 V and 60 Hz and supplied to the supply lines $28_1$–$28_3$, $29_1$–$29_3$ via a voltage switch.

Furthermore, the voltage source 30 comprises three input signal lines 90 via which the voltage source 30 can be controlled centrally. One signal line $90_1$ is used to transmit the "fasten seat belts" signal to the voltage source 30. In the "fasten seat belts" mode, the voltage supply for the supply devices 16 is switched off after a delay of, for example, 60 seconds, which allows to switch off the connected devices in a controlled manner, to ensure a safe flight operation without interferences, for example when taking off or landing.

An emergency turn-off of the entire voltage supply apparatus can be executed via a second control line $90_2$. If a corresponding switch is operated and a corresponding signal is transmitted via said signal line $90_2$ to the voltage source 30, this immediately turns off the voltage supply to all the supply devices 16.

The voltage source 30 is switched from the operational mode to the test mode via the third signal line $90_3$. In the test mode, which is also active after each activation of the voltage source 30, but can also be activated at any time, the entire voltage supply apparatus is tested, with the electric properties of the voltage source 30 and the connected supply devices 16 being tested. After the system test has been performed without error, the supply voltage for the supply devices 16, 16' is enabled by the voltage source 30.

After the voltage source 30 has been activated and the subsequent system test has been performed, the supply voltage is applied to the supply lines 28, 29 by a voltage switch in the voltage source 30 so that the supply voltage is supplied to all the connected supply devices 16, 16'.

When the contact pins 53, 54 of a plug 38 of an electric device 36 are inserted, the microswitches 45, 46 are activated by the inserted contact pins 40, 41. Between the first activation of the one contact switch 45 and that of the other contact switch 46, a contact time is obtained by the control and supervision unit 60. If this contact time is below a maximum value, a corresponding enabling information is stored in the control and supervision unit 60. Furthermore, the control and supervision unit 60 requests the status of the reflection sensor 48. If the plug casing 51 is close enough to the reflection sensor 48 with the frontal side 50 thereof, a corresponding signal is outputted to the control and supervision unit 60. If the reflection sensor signal and the enabling information are provided, the control and supervision unit 60 applies the supply voltage to the supply line 20 by means of an internal voltage switch so that the contact pins 53, 54 are provided with mains voltage via the contact elements 42, 43.

If such a number of many electric devices 36 are connected to the supply devices 16, 16' that a predetermined power threshold value of 3500 watts is exceeded, the voltage source 30 outputs a disabling signal to all the supply devices 16 via the responding signal line $28_5$, $29_5$, which signal causes the supply of further electric devices to be disabled. This disablement is correspondingly indicated by the display device 32 in the armrest 24.

In the normal case, the voltage supply for the supply devices 16, 16' is enabled by the voltage source 30 after the take-off phase of the plane. The voltage source can be turned off at a delay of 60 seconds by means of the "fasten seat belts" switch or immediately by means of an emergency turn-off switch. In the case of a "fasten seat belts" turn-off, the imminent voltage interruption is indicated by the display device 32, for example by a flashing LED, so that the user can turn off their electric device, for example a computer, in a controlled manner.

Due to the safety elements described, the voltage supply apparatus both fulfils high requirements on the safety of people from mains voltages and on the security of the on-board network from interferences from electric devices. That way, a substantial improvement of comfort and service for the passenger is achieved on a high safety level. An additional safety improvement is obtained by the possibility to detect mains-independent electric devices.

We claim:

1. A voltage supply apparatus for providing a supply voltage for an electric device comprising a socket to which an electric device is adapted to be connected by means of a plug, means for supplying supply voltage to the socket, the socket including plug detector means for detecting the presence of a plug inserted in the socket, said voltage supplying means being provided remotely from the socket and being connected to the socket by a signal line and a supply line, the voltage supplying means being constructed and arranged for applying the supply voltage to the socket when the plug detector means indicates the presence of a plug over the signal line to the voltage supplying means, the plug detector means being constructed and arranged to detect the presence of contact pins of a plug in the socket, and control means responsive to plug presence detection by said plug detector means for rendering the voltage supplying means operative to supply the supply voltage to the socket only if the time between the detection of a first contact pin and the subsequent detection of a second contact pin of the plug does not exceed a predetermined maximum time value.

2. The voltage supply apparatus as defined in claim 1 wherein the plug detector means includes mechanical switches activated by contact pins of a plug inserted into the socket.

3. The voltage supply apparatus as defined in claim 1 wherein the socket and the voltage supplying means are associated with a seat of an aircraft.

4. The voltage supply apparatus as defined in claim 1 including central voltage source means for supplying supply voltage to a plurality of voltage supply means, and said control means is constructed and arranged for cutting-off voltage of said central voltage source means.

5. The voltage supply apparatus as defined in claim 1 wherein the plug detector means includes casing detector means for detecting the presence of a plug casing of the plug at the socket.

6. The voltage supply apparatus as defined in claim 5 wherein the casing detector means is optical reflection sensor means for detecting a minimum distance of a plug casing relative to the socket.

7. The voltage supply apparatus as defined in claim 5 wherein the control means renders the voltage supplying means operative to supply the supply voltage to the socket only if both the plug detector means and the casing detector means indicate the presence of a plug.

8. The voltage supply apparatus as defined in claim 1 including line supervision detector means for detecting electromagnetic interferences of certain frequencies in electric lines of the apparatus to which said control means is responsive.

9. The voltage supply apparatus as defined in claim 8 including voltage switch means for turning off the voltage supply if the line supervision detector means detects certain frequencies.

10. The voltage supply apparatus as defined in claim 1 including receiver detector means for detecting electromagnetic interference signals of certain frequencies to which said control means is responsive.

11. The voltage supply apparatus as defined in claim 10 including voltage switch means for turning off the voltage supply of the receiver detector means detects electromagnetic signals of certain frequencies.

12. The voltage supply apparatus as defined in claim 1 including fault current detector means for detecting fault current to which said control means is responsive.

13. The voltage supply apparatus as defined in claim 12 including voltage switch means for turning off the voltage supply if the fault current detector detects fault current.

14. The voltage supply apparatus as defined in claim 1 including short circuit detector means for detecting a short circuit to which said control means is responsive.

15. The voltage supply apparatus as defined in claim 14 including voltage switch means for turning off the voltage supply if the short circuit detector means detects a short circuit.

* * * * *